United States Patent
Kato et al.

(10) Patent No.: US 6,328,351 B1
(45) Date of Patent: Dec. 11, 2001

(54) PIPE JOINT WITH ENLARGED METAL PIPE AND METHOD FOR MANUFACTURING SAME

(75) Inventors: Hisao Kato, Nagoya; Toshiya Eto; Ryoichi Izumi, both of Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/356,441

(22) Filed: Jul. 19, 1999

(30) Foreign Application Priority Data

Jul. 27, 1998 (JP) .................................................. 10-211442

(51) Int. Cl.⁷ .................................................. F16L 19/028
(52) U.S. Cl. ........................................ 285/368; 285/382.4
(58) Field of Search ............................. 285/142.1, 141.1, 285/368, 382.4

(56) References Cited

U.S. PATENT DOCUMENTS 4,130,932 * 12/1978 Epmeier .
4,142,843 * 3/1979 Kish .
5,810,054 * 9/1998 Goulet .
5,853,201 * 12/1998 Izumi et al. .
6,016,843 * 1/2000 Wada et al. .

FOREIGN PATENT DOCUMENTS 0 791 776 A1   8/1997 (EP) .
A-8-247357     9/1996 (JP) .

\* cited by examiner

*Primary Examiner*—Teri Pham Luu
(74) *Attorney, Agent, or Firm*—Harness, Dickey & Pierce, PLC

(57) ABSTRACT

A pipe joint is comprised of a joint base member having an opening for a fluid conduit, a flange member fixed with the joint base member and a metal pipe having a first enlarged portion inserted into the opening, a second enlarged portion placed in an installation bore of the flange and a bulging portion pressed against a second end surface of the flange member. The bulging portion is formed by making the outer surface of the pipe swell at the same time when the pipe is inserted into the installation bore and enlarged by a enlargement punch to form the second enlarged portion.

5 Claims, 6 Drawing Sheets

PIPE JOINT WITH ENLARGED METAL PIPE AND METHOD FOR MANUFACTURING SAME

CROSS REFERENCE TO RELATED APPLICATION

This application is based upon and claims the benefit of priority of Japanese Patent Applications No. H.10-211442 filed on Jul. 27,1998, the contents of which are incorporated herein by reference.

BACKGROUND OF THE INVENTION

1. Field of the Invention

The present invention relates to a pipe joint, a metal pipe with a flange to be joined to a base member and a method for manufacturing the same, in particular, applicable to refrigerant piping or hot water piping in an air conditioner for vehicles.

2. Description of Related Art

Conventionally, a pipe joint described in JP-A-8-247357 is well known. According to the conventional pipe joint, a flange member 20 is provided with an installation bore 26, the inner diameter of which is gradually reduced from one end 20b toward the other end 20a, as shown in FIG. 7. After inserting a pipe 10 into the installation bore 26, a mandrel 80 is placed inside the pipe 10 to prevent the deformation of the inside of the pipe 10, as shown in FIG. 8. Then, the pipe 10 is pressed in an axial direction from both sides with a given clamp mechanism (not shown), as if the flange member 20 is sandwiched, as shown by an arrow 81. When the pipe 10 is pressed as mentioned above, the diameter of the pipe 10 is partly enlarged to fill a clearance B (refer to FIG. 7) between the inside surface of the installation bore 26 and the outside surface of the pipe 10, and a bulging portion 16 of the pipe 10 is formed at a position just behind an end surface 20a of the flange member 20.

As a next step, an axial pressing force is applied to the pipe 10 from the direction shown by an arrow 82 in FIG. 9 with another given clamp mechanism (not shown). Therefore, the bulging portion 16 is further crushed in an axial direction to form a final shape thereof.

Further, when an axial pressing force is applied to the pipe 10 from the direction shown by an arrow 83 in FIG. 10 with a further given clamp mechanism (not shown), the end of the pipe 10 is radially expanded. As a result, an enlarged pipe opening 17 is formed and also a groove 18 for storing an O ring 13 is formed between the enlarged pipe opening 17 and the bulging portion 16.

FIG. 11 shows an embodiment of the pipe joint manufactured as mentioned above, in which the O ring 13 is stored in the groove 18 and a periphery portion (16, 17 and 18) of the pipe 10 is inserted into an opening 32 of a joint base member 30 (joint opponent member) to connect the pipe 10 to the opening 32.

According to the conventional embodiment mentioned above, the force for joining the pipe 10 with the flange member 20 is relatively weak because the pipe 10 is not sufficiently pressed to the inside surface of the installation bore 26, as the inside of the pipe 10 is merely expanded by the pressing force toward the axial direction to the pipe 10.

SUMMARY OF THE INVENTION

The present invention has been made in view of the above mentioned problem, and an object of the present invention is to provide a pipe joint in which the force for joining a metal pipe with a flange member is stronger and a method for manufacturing the pipe joint. To achieve the above object, a metal pipe 10 is provided with a first enlarged portion 11 inserted to an opening 32 of a joint base member 30. The pipe 10 is firmly fixed with the joint base member 30 through a flange member 20. The pipe 10 is further provided with a second enlarged portion 14, a bulging portion 15 and an extending portion 19.

The second enlarged portion 14 is formed by drawing an enlargement punch 70 through the inside of the pipe 10 to expand the inside diameter of the pipe 10 after the pipe 10 is inserted into an installation bore 22 of the flange member 20. Therefore, the inside diameter of the second enlarged portion becomes larger than that of the other part of the pipe 10 and the second enlarged portion 14 is radially and rigidly pressed against substantially the entire inside surface of the installation bore 22.

The bulging portion 15 is formed by making a part of the outer circumference surface of the pipe 10 swell, preferably, at the same time when the second enlarged portion 14 is formed. The bulging portion 15 is rigidly pressed against an end surface 20b of the flange member 20 and serves to prevent the axial direction movement of the pipe 10. A remaining part of the pipe 10 is the extending portion 19.

It is another aspect of the present invention to provide an uneven surface 24 like a knurling surface at the inside of the installation bore 22 so that the outer circumference surface of the second enlarged portion 14 may be formed into the uneven surface of the installation bore 22 when the pipe 10 is radially expanded by the punch 70. Therefore, the force of joining the pipe 10 with the flange member 20 becomes stronger.

It is a further aspect of the present invention to provide a cylindrical holding surface 25 at the inside of the installation bore 22 so that the outer circumference surface of the second enlarged portion 14 may be uniformly pressed against the inner circumference of the cylindrical holding surface 25. Thus, the cylindrical holding surface 25 serves not to form a gap between the pipe 10 and the flange member 20, through which fluid such as water may pass.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
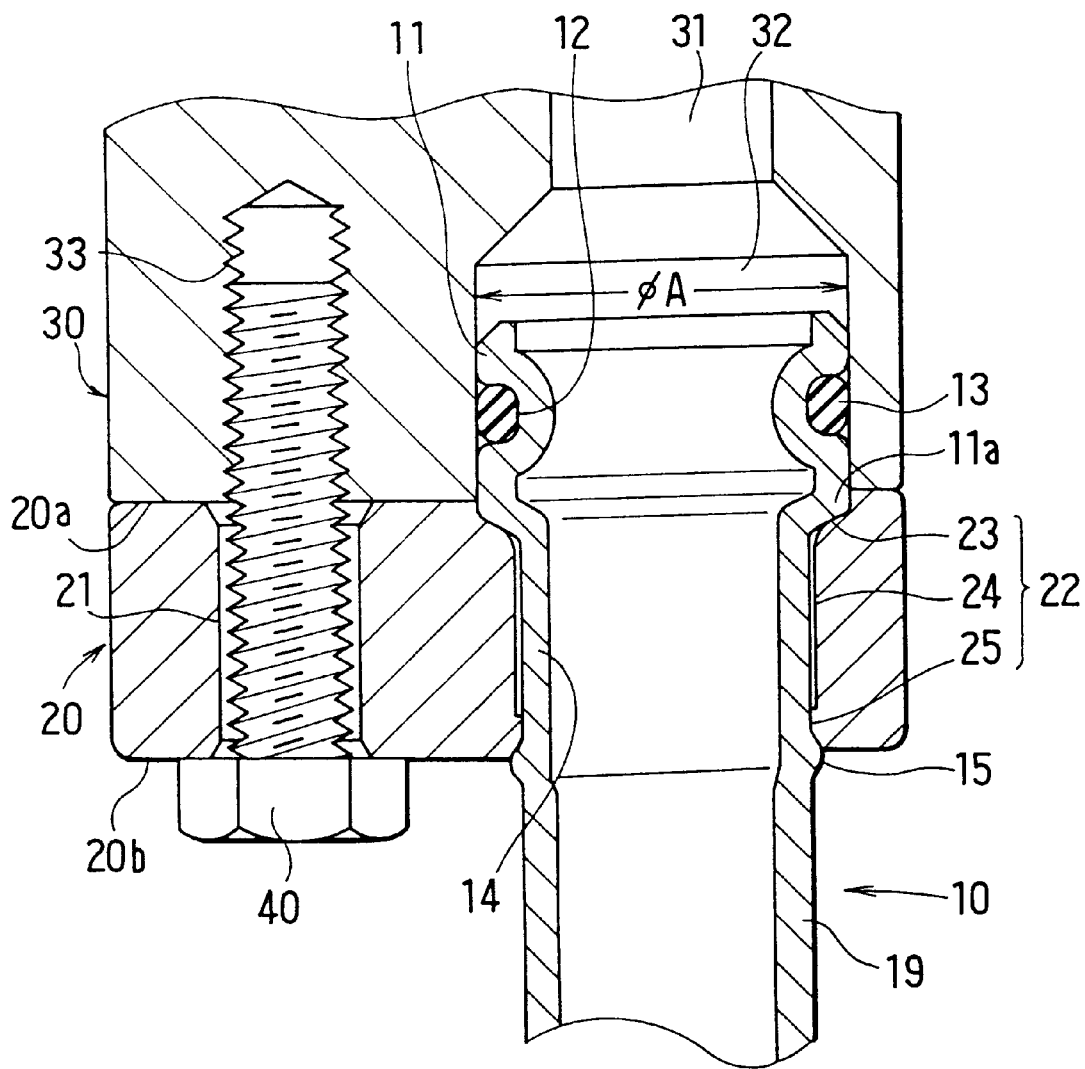
FIG. 1 is a cross sectional view of a pipe joint according to an embodiment of the present invention.

FIG. 1 shows a pipe joint applicable to various piping such as refrigerant piping utilized in a refrigeration cycle or hot water piping for vehicle air conditioners according to an embodiment of the present invention. The pipe joint applied to the refrigerant piping is described hereinafter.

A pipe 10 is made of metal such as aluminum and the leading end of the pipe 10 is firmly fixed to a joint base member 30 (joint opponent member) through a flange member 20 by a fastener such as a bolt 40. The joint base member 30 is, for example, a housing of a compressor for the refrigeration cycle or a member disposed in a tank of a condenser and is made of metal such as aluminum. The joint base member 30 is provided with a fluid (refrigerant) conduit 31 and a circular opening 32 communicated with the fluid conduit 31. The opening 32 is placed at the end of the fluid conduit 31 and the inside diameter of the opening 32 is larger than that of the fluid conduit 31. The joint base member 30 is provided with a female screw 33 for fastening the bolt 40.

A first enlarged portion 11 is formed at the leading end of the pipe 10 and an O ring 13 (elastic sealing material) is stored in a groove 12 provided at the first enlarged portion 11. The first enlarged portion 11 is inserted into the opening 32, while the O ring 13 is elastically pressed against the inner surface of the opening 32 to ensure the sealing between the first enlarged portion 11 of the pipe 10 and the opening 32 of the joint base member 30.

The flange member 20 is also made of metal such as aluminum and is provided with a fastening bore 21 and an installation bore 22. The bolt 40 is inserted through the fastening bore 21 for fastening the flange member 20 to the joint base member 30. The pipe 10 inserted into the installation bore 22 is radially and rigidly pressed against an inner surface of the installation bore 22.

The installation bore 22 of the flange member 20 is comprised of a plate shaped enlarged surface 23, a knurling surface 24 and a cylindrical holding surface 25. The plate shaped enlarged surface 23 is positioned at the end of the installation bore 22 on a side of an end surface 20a (first end surface) of the flange member 20 and holds a shoulder portion 11a of the first enlarged portion 11 extending therefrom into the opening 32.

The cylindrical holding surface 25 is positioned on a side of another end surface 20b (second end surface) and is uniformly pressed from the outer circumference surface of the second enlarged portion 14. The knurling surface 24 is an uneven surface on which a plurality of longitudinal convex portions 24a and concave portions 24b are alternatively formed in a circumference direction. The inner diameter of the cylindrical holding surface 25 is identical to the inner diameter of respective tops of the convex portions 24a. The outer circumference surface of the second enlarged portion 14 is formed into the knurling surface 24 to ensure a stronger force for joining the pipe 10 with the flange member 20.

Further, a bulging portion 15 is formed on the outer circumference surface of the pipe 10 to be rigidly pressed against the second end surface 20b of the flange member 20. An extending portion 19 of the pipe 10 is extended from the end of the installation bore 22 on a side of the second end surface 20b.

The second enlarged portion 14, the bulging portion 15 and the shoulder portion 11a serve to firmly join the pipe 10 with the flange member 20. In particular, the uneven knurling surface 24 prevents a circumference direction (rotating) movement of the pipe 10, and the bulging portion 15 and the shoulder portion 11a prevent an axial direction movement of the pipe in the installation bore 22.

Figure 2:
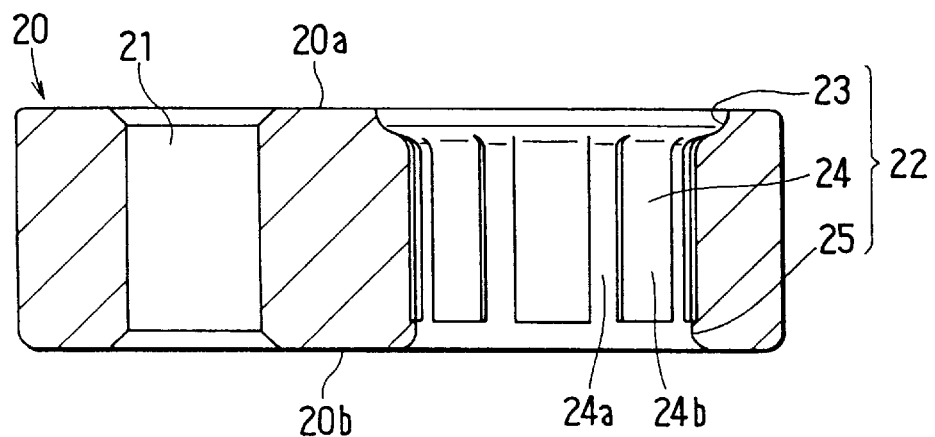
FIG. 2 is a cross sectional view of a flange member shown in FIG. 1.

Next, a method for manufacturing the pipe joint will be described below. The flange member 20 is primarily formed before the pipe 10 is joined as shown in FIG. 2, for example, by aluminum die-casting. As a method for forming the pipe 10 or joining the pipe 10 with the flange member 20 is a gist of the present invention, the steps of these processes are described sequentially hereinafter.

Figure 3:
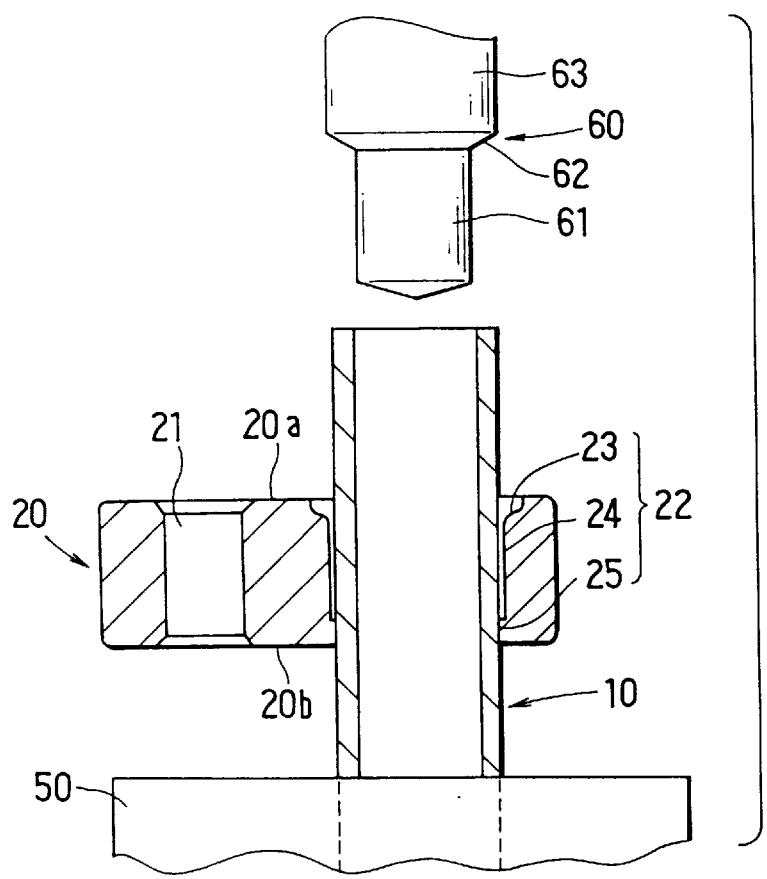
FIG. 3 is a drawing explaining a method for manufacturing the pipe joint according to the embodiment of the present invention.

As shown in FIG. 3, a pipe 10 whose diameter is uniform along the longitudinal direction is inserted into the installation bore 22 from the second end surface 22b until a predetermined longitudinal length of the pipe 10 is protruded upward from the first end surface 20a. Then, the pipe is clamped by a pipe chuck equipment 50 located below the second end surface 20b.

Figure 4:
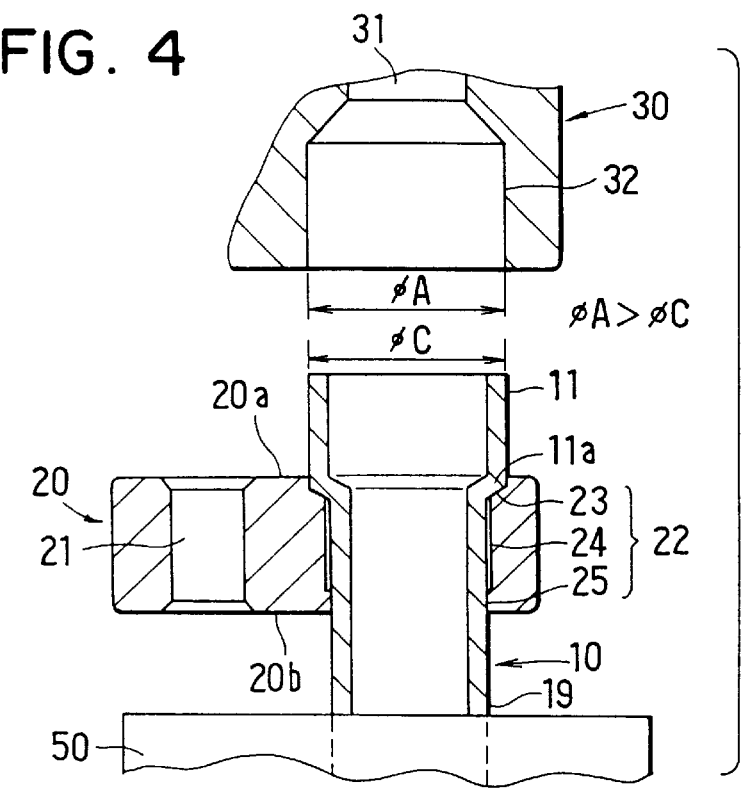
FIG. 4 is a second drawing explaining a method for manufacturing the pipe joint according to the embodiment of the present invention.

As a first step of enlarging the pipe 10, a first enlargement punch 60 is prepared. The first enlargement punch 60 is provided with a small diameter guiding portion 61 whose outside diameter is a little smaller than that of the inside diameter of the pipe 10, a large diameter portion 63 whose outside diameter is larger by a given amount than that of the inside diameter of the pipe 10, and a taper portion 62 bridging the small diameter guiding portion 61 and the large diameter portion 63. The first enlarged punch 60 is inserted into the inside of the pipe 10 from the leading end thereof to enlarge the diameter of the portion of the pipe 10 protruded from the first end surface 20a by the taper portion 62 and the large diameter portion 63. As a result, the enlarged portion 11 is formed as shown in FIG. 4.

At the first step of enlarging the pipe 10, the shoulder portion 1a of the first enlarged portion 11 is pressed against the plate shaped enlarged surface 23 of the flange member 20, as the flange member 20 is also clamped by a clamp mechanism (not shown). The outside diameter (C) of the first enlarged portion 11 is a little smaller than that (A) of the opening 32 of the joint base member 30.

Figure 5:
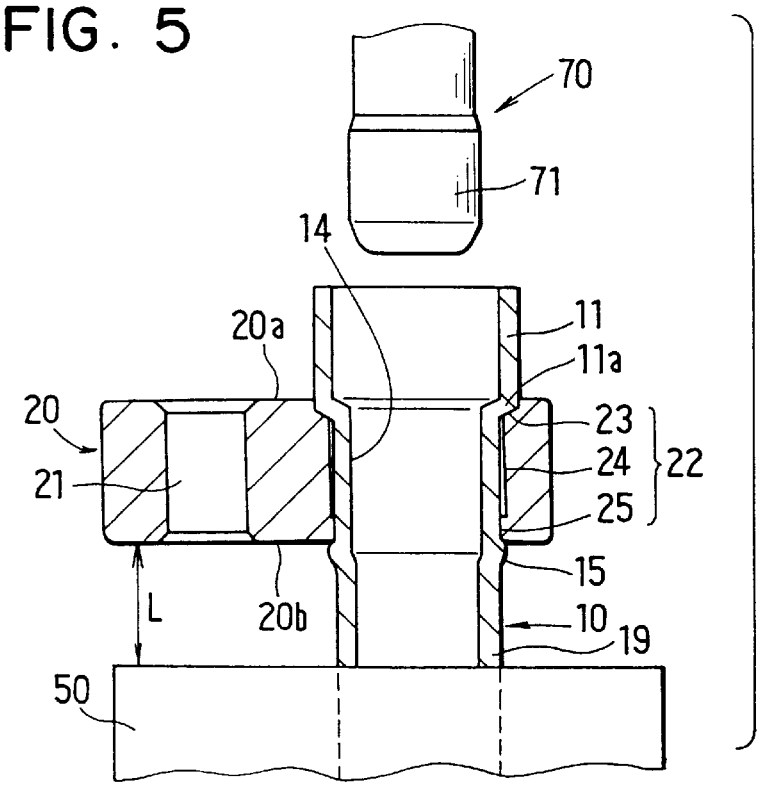
FIG. 5 is a third drawing explaining a method for manufacturing the pipe joint according to the embodiment of the present invention.
Figure 6:
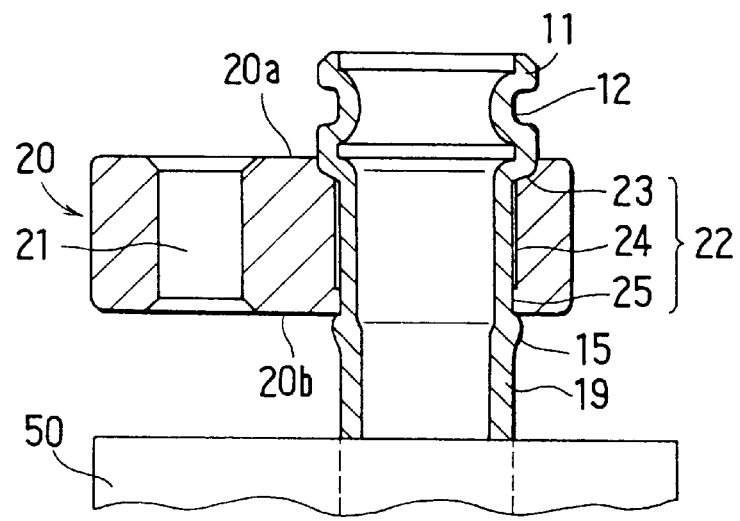
FIG. 6 is a fourth drawing explaining a method for manufacturing the pipe joint according to the embodiment of the present invention.
Figure 7:
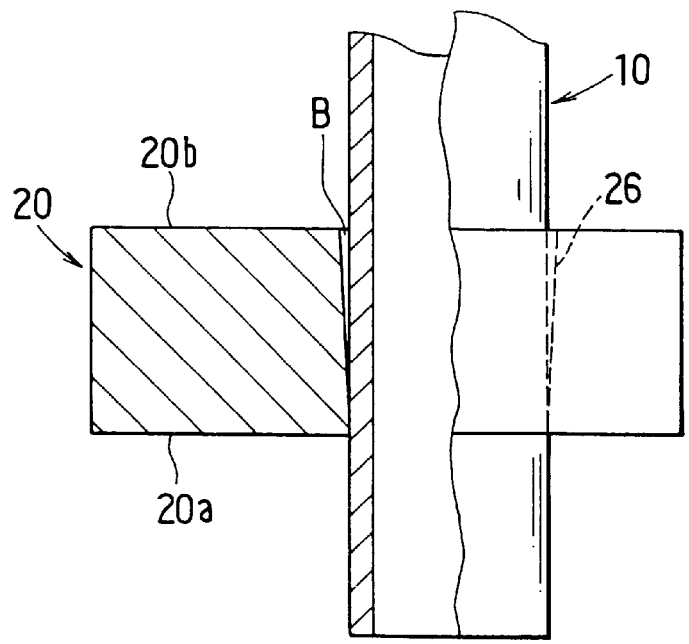
FIG. 7 is a first drawing explaining a conventional method for manufacturing the pipe joint as a prior art.
Figure 8:
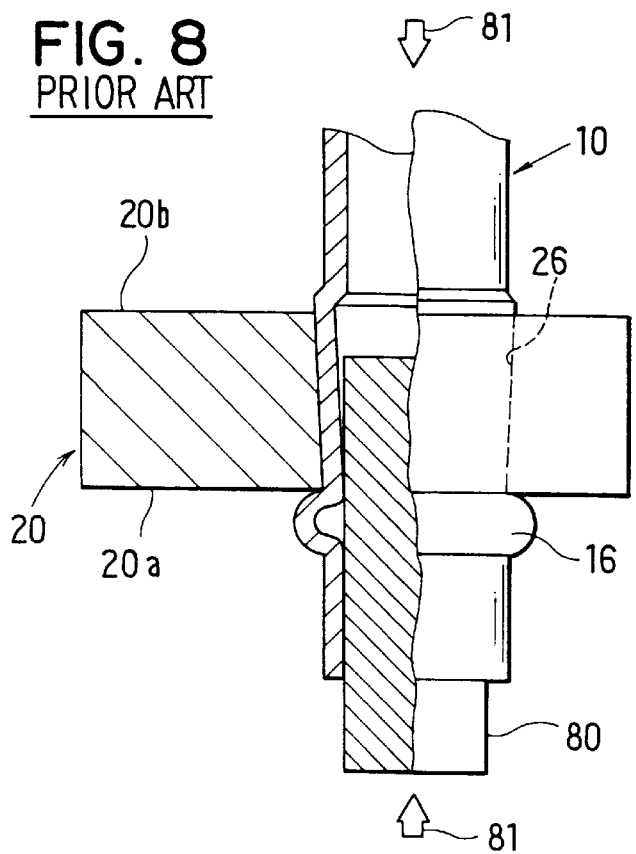
FIG. 8 is a second drawing explaining a conventional method for manufacturing the pipe joint as a prior art.
Figure 9:
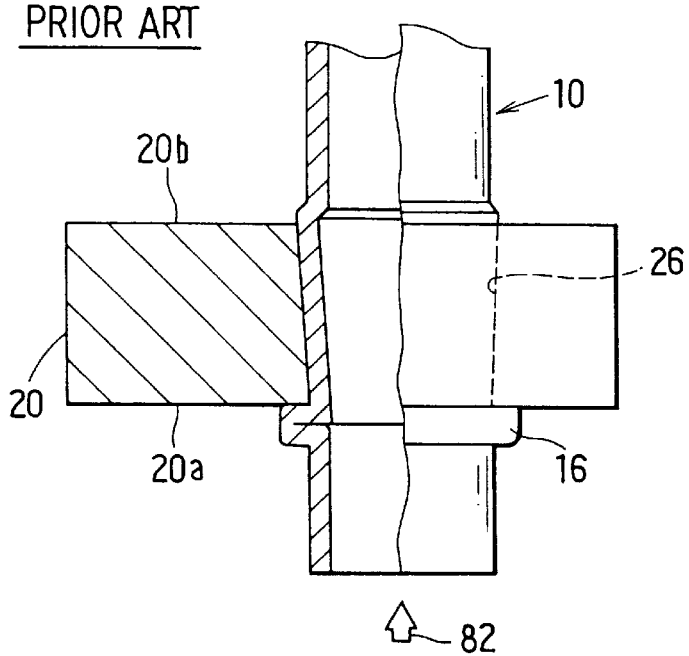
FIG. 9 is a third drawing explaining a conventional method for manufacturing the pipe joint as a prior art.
Figure 10:
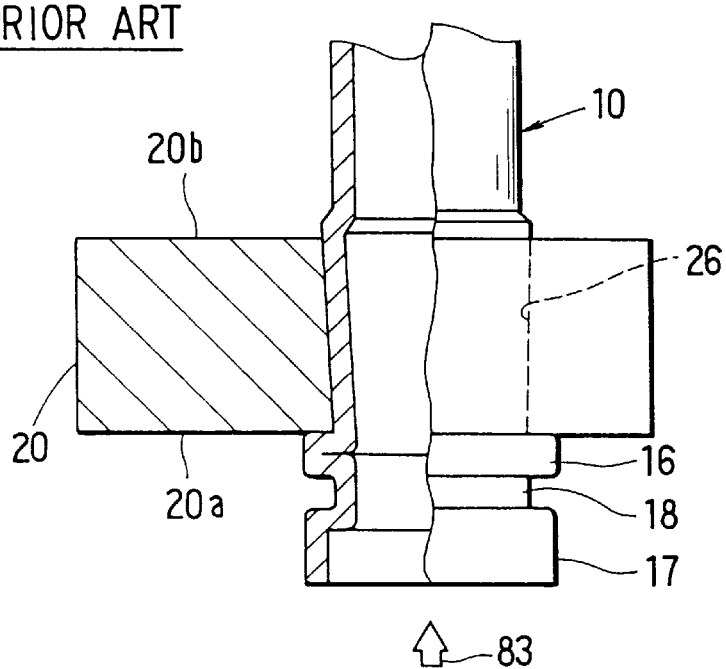
FIG. 10 is a fourth drawing explaining a conventional method for manufacturing the pipe joint as a prior art.
Figure 11:
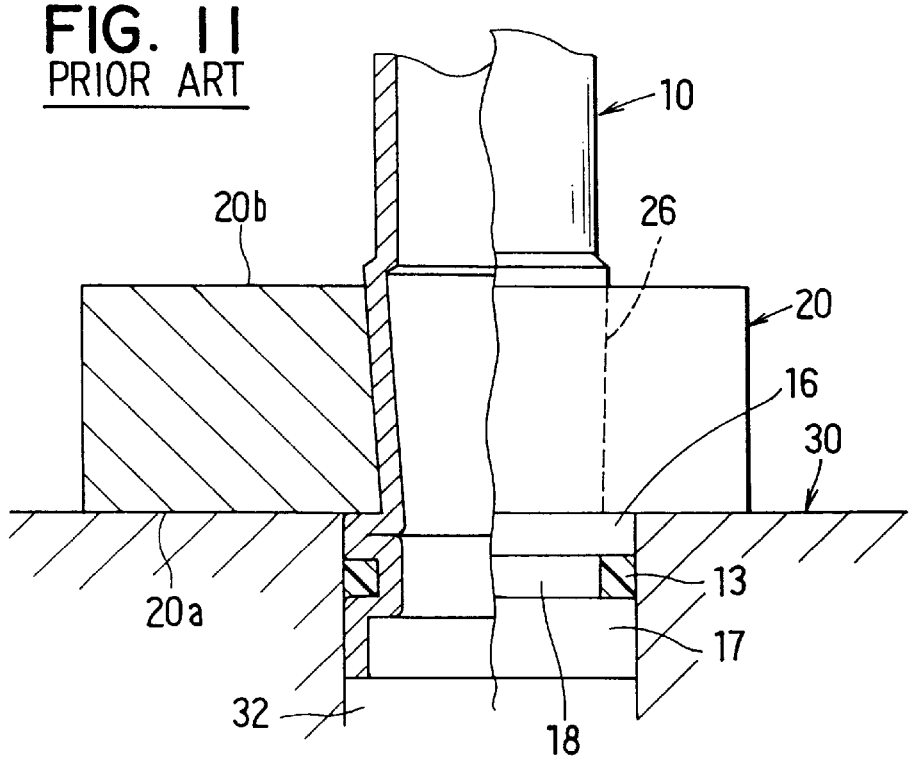
FIG. 11 is a cross sectional view of the conventional pipe joint as a prior art.

As a second step of enlarging the pipe 10, a second enlargement punch 70 is prepared. The second enlargement punch 70 is provided with a leading end punch portion 71 whose diameter is a little larger than that of the inside diameter of the pipe 10 but smaller than the large diameter portion 63 of the first enlargement punch 60. The second enlargement punch 70 is inserted through the inside of the first enlarged portion 11 into 10 to enlarge the diameter of substantially the entire portion of the pipe 10 placed in the installation bore 22. Thus, the second enlarged portion 14 is formed as shown in FIG. 5. When the second enlargement punch 70 is inserted into the inside of the pipe 10 in a manner that the enlargement range by the leading end punch portion 71 reaches just behind the second end surface 20b, the bulging portion 15 is also formed so as to be rigidly pressed against the second end surface 20b.

In the above mentioned process, the flange member 20 and the pipe 10 are clamped to keep the distance between the second end surface 20b and the pipe chuck equipment 50 at a predetermined amount (L). Further, the entire outer circumference surface of the second enlarged portion 14 becomes formed into the uneven knurling surface 24 and, partly, is uniformly pressed all around the inner circumference of the cylindrical holding surface 25.

Finally, a rotating roller (not shown) rotatable around the outer circumference of the first enlarged portion 11 is pressed against a given position of the outer surface of the first enlarged portion 11 to form the groove 12 for storing the O ring 13.

According to the embodiment mentioned above, the second enlarged portion 14 is formed after forming the first enlarged portion 11. However, it may be possible to form simultaneously the first and second enlarged portions 11 and 14 in one pipe enlargement process.

On the other hand, though the bulging portion 15 is formed at the same time when the second enlarged portion 14 is formed, the bulging portion 15 may be formed independently after or before forming the second enlarged portion 14.

What is claimed is:

1. A pipe joint comprising:
    a joint base member having an opening for a fluid conduit;
    a metal pipe having a first enlarged portion, a second enlarged portion, a bulging portion and an extending portion; and
    a flange member having first and second end surfaces and an installation bore penetrating from the first end surface to the second end surface, and fixed with the joint base member on a side of the first end surface, the installation bore being provided at an end thereof on a side of the first end surface with a plate shaped enlarged portion, a circular holding surface at another end thereof on a side of the second end surface, and an intermediate inner circumference surface between the plate shaped portions and the cylindrical holding surface, said intermediate inner circumference surface being provided with a plurality of convex and concave portions, wherein the first enlarged portion protrudes from the plate shaped enlarged portion and inserted into the opening, an outside circumference surface of the second enlarged portion is engaged with the intermediate inner circumference surface and the cylindrical holding surface inside the installation bore, the bulging portion rises from the pipe so as to be in contact with the second end surface at another end of the installation bore and the extending portion is extended from the bulging portion in a direction opposite to the first enlarged portion, and, further, wherein the inside diameter of the second enlarged portion is larger than that of the extending portion and smaller than that of the first enlarged portion, the outside circumference surface of the second enlarged portion is in mesh with the concave and convex portions, the entire cylindrical holding surface being equal to or smaller in diameter than a diameter defined by the convex portions of the intermediate inner circumference surface so as to prevent a rotating movement of the pipe so as to seal a clearance between the pipe and the installation bore on a side of the second surface, and the first enlarged portion and the bulging portion are rigidly pressed against the flange member on both sides of the first and second end surfaces, respectively, so that an axial movement of the pipe may be prevented, and, furthermore, wherein the bulging portion is formed in a manner that a part of the second enlarged portion is forced out longitudinally when the second enlarged portion is formed.

2. A pipe joint according to claim 1, wherein the inner surface is a knurling surface.

3. A pipe with a flange to be joined to a joint base member comprising:
    a metal pipe having a first enlarged portion, a second enlarged portion, a bulging portion and an extending portion; and
    a flange member having first and second end surfaces and an installation bore penetrating from the first end surface to the second end surface, the installation bore being provided at an end thereof on a side of the first end surface with a plate shaped enlarged portion, a circular holding surface at another end thereof on a side of the second end surface, and an intermediate inner circumference surface between the plate shaped portion and the cylindrical holding surface, said intermediate inner circumference surface being provided with a plurality of convex and concave portions, wherein the first enlarged portion protrudes from the plate shaped enlarged portion, an outer circumference of the second enlarged portion is engaged with the intermediate inner circumference surface of the cylindrical holding surface inside the installation bore, the bulging portion rises from the pipe so as to be in contact with the second end surface at another end of the installation bore and the extending portion is extended from the bulging portion in a direction opposite to the first enlarged portion, and, further, wherein the inside diameter of the second enlarged portion is larger than that of the extending portion and smaller than that of the first enlarged portion, the outside circumference surface of the second enlarged portion is in mesh with the concave and convex portions so as to prevent a rotating movement of the pipe, the entire cylindrical holding surface being equal to or smaller in diameter than a diameter formed by the convex portions of the intermediate inner circumference surface so as to seal a clearance between the pipe and the installation bore on a side of the second surface, and the first enlarged portion and the bulging portion are rigidly pressed against the flange member on both sides of the first and second end surfaces, respectively, so that an axial movement of the pipe may be prevented, and, furthermore, wherein the bulging portion is formed in a manner that a part of the second enlarged portion is forced out longitudinally when the second enlarged portion is formed.

4. A pipe with a flange according to claim 3, wherein the inner surface is a knurling surface.

5. A pipe joint comprising:

a joint base member having an opening for a fluid conduit;

a flange member secured to said joint base member, said flange member having a first surface engaging said joint base and said second surface spaced from said first surface, said flange member defining an installation bore having an enlarged portion adjacent said first surface, a circular holding surface located below and adjacent said second surface and an intermediate surface disposed between said enlarged portion and said circular holding surface, said intermediate surface defining a plurality of convex and concave portions, said entire circular holding surface being equal to or smaller in diameter than a diameter defined by said convex portions of said intermediate surface;

a metal pipe extending through said installation bore, said metal pipe having a first enlarged portion engaging said enlarged portion of said installation bore and protruding from said installation bore, a second enlarged portion having an outer surface meshing with said concave and convex portions and in engagement with said circular holding surface, a bulging portion engaging said second surface of said flange member and an extending section extending from said bulging portion.

* * * * *